United States Patent
Bertens et al.

(10) Patent No.: US 8,442,340 B2
(45) Date of Patent: May 14, 2013

(54) METHOD OF GENERATING A MULTISCALE CONTRAST ENHANCED IMAGE

(75) Inventors: Tom Bertens, Mortsel (BE); Pieter Vuylsteke, Mortsel (BE)

(73) Assignee: Agfa HealthCare NV, Mortsel (BE)

( * ) Notice: Subject to any disclaimer, the term of this patent is extended or adjusted under 35 U.S.C. 154(b) by 306 days.

(21) Appl. No.: 12/681,791

(22) PCT Filed: Oct. 2, 2008

(86) PCT No.: PCT/EP2008/063235
§ 371 (c)(1),
(2), (4) Date: May 6, 2010

(87) PCT Pub. No.: WO2009/047208
PCT Pub. Date: Apr. 16, 2009

(65) Prior Publication Data
US 2010/0220911 A1 Sep. 2, 2010

(30) Foreign Application Priority Data
Oct. 8, 2007 (EP) .................................... 07118032

(51) Int. Cl.
*G06K 9/40* (2006.01)
(52) U.S. Cl.
USPC ........... 382/254; 382/255; 382/263; 382/264; 382/274; 382/275
(58) Field of Classification Search .................. 382/254, 382/255, 260, 261, 262, 263, 264, 265, 266, 382/274, 275, 298, 299
See application file for complete search history.

(56) References Cited

U.S. PATENT DOCUMENTS
2008/0137925 A1 6/2008 Bertens et al.
2008/0137977 A1 6/2008 Bertens et al.

FOREIGN PATENT DOCUMENTS
EP 0 525 527 A2 2/1993
EP 0 527 525 A2 2/1993
WO 2004/055724 A2 7/2004

OTHER PUBLICATIONS
Aach, T., et al., "Spatiotemporal Multiscale Vessel Enhancement for Coronary Angiograms," Medical Imaging 2002, SPIE, No. 4684, pp. 1010-1021, Feb. 28, 2002.
(Continued)

*Primary Examiner* — Brian Le
(74) *Attorney, Agent, or Firm* — Houston & Associates, LLP

(57) ABSTRACT

At least one approximation image is created of the image at one or multiple scales. Translation difference images are created by pixel-wise subtracting the values of an approximation image at scale s and the values of a translated version of the approximation image. A non-linear modification is applied to the values of the translation difference image (s) and at least one enhanced center difference image at a specific scale is computed by combining the modified translation difference images at that scale or a smaller scale with weights $W_{i,j}$. An enhanced image is computed by applying a reconstruction algorithm to the enhanced center difference images. The non-linear modification of the values of the translation difference images is steered by the values of an orientation map which comprises for each pixel a local direction of interest. In addition or alternatively, at least one enhanced center difference image is computed by anisotropic weighing of the enhanced translation differences with weights steered by the orientation map.

21 Claims, 9 Drawing Sheets

OTHER PUBLICATIONS

Kunz, D., et al., "A nonlinear multi-resolution gradient adaptive filter for medical images," Proceedings of SPIE, vol. 5032, pp. 732-742, Jan. 1, 2003.

Mallat, S., "A Theory for Multiresolution Signal Decomposition: The Wavelet Representation," IEEE Transactions on Pattern Analysis and Machine Intelligence, vol. 11, No. 7, pp. 674-693, Jul. 1989.

International Search Report mailed on Jan. 29, 2009, from corresponding International Application No. PCT/EP2008/063235, filed on Oct. 2, 2008.

International Preliminary Report on Patentability issued Apr. 13, 2010, from corresponding International Application No. PCT/EP2008/063235, filed on Oct. 2, 2008.

Legenda

| Symbol | |
|---|---|
| $g_k$ | Approximation image at scale k |
| $d_k$ | Detail image at scale k |
| $h_k$ | Contrast enhanced approximation image at scale k |
| ⓛv | Low-pass filtering of input image, followed by subsampling |
| ⓥᵐ | Subsampling m consecutive times |
| ⌃ | Upsampling |
| ⊕ | Addition |
| ⊗ | Multiplication |
| Ⓢ | Summation |
| ⊘ | Division |
| ⊕ (grid) | Moving neighborhood operator (used to compute the translation differences) |
| M | Orientation map |
| $w_j$ | Weighing factors |
| LUT | Conversion operator |
| $A_m$ | Optional filtering of the approximation |
| B | Optional transform of the residual image |

FIG. 7

Approximation image $g_{k-m}$
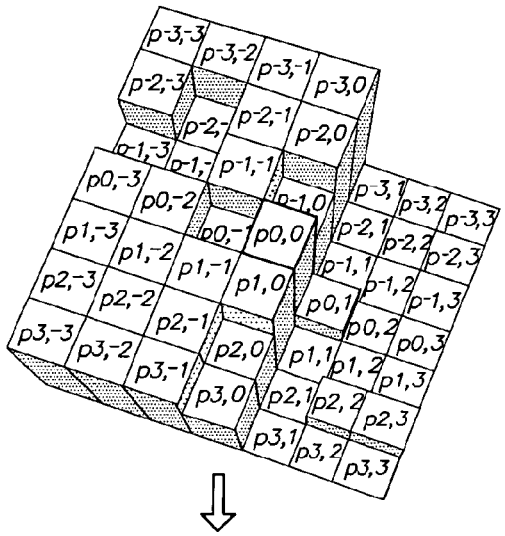
Orientation vector $M(i,j)$ for $p_{0,0}$
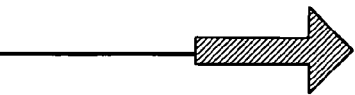
Translation differences
Enhanced translation differences
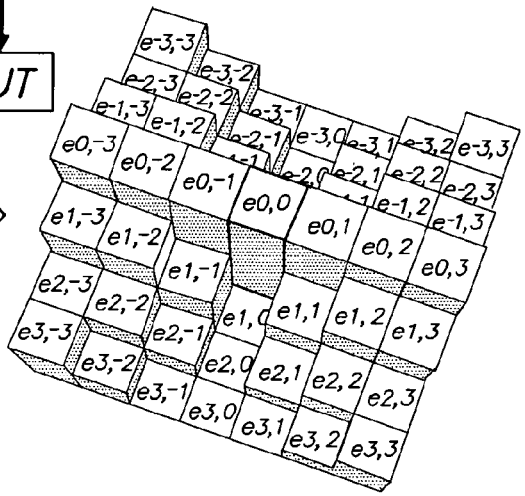
LUT
Isotropic weights
$$\Sigma\, W \times E = h_{0,0}$$
FIG. 8

Approximation image $g_{k-m}$
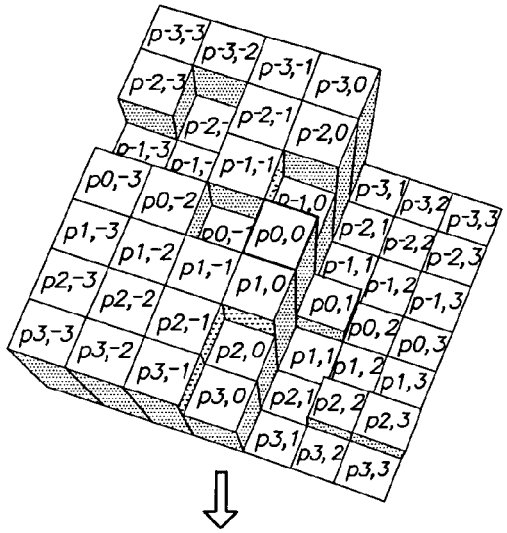
Orientation vector $M(i,j)$ for $p_{0,0}$
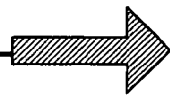
Translation differences
| d-3,-3 | d-3,-2 | d-3,-1 | d-3,0 | d-3,1 | d-3,2 | d-3,3 |
|---|---|---|---|---|---|---|
| d-2,-3 | d-2,-2 | d-2,-1 | d-2,0 | d-2,1 | d-2,2 | d-2,3 |
| d-1,-3 | d-1,-2 | d-1,-1 | d-1,0 | d-1,1 | d-1,2 | d-1,3 |
| d0,-3 | d0,-2 | d0,-1 | 0 | d0,1 | d0,2 | d0,3 |
| d1,-3 | d1,-2 | d1,-1 | d1,0 | d1,1 | d1,2 | d1,3 |
| d2,-3 | d2,-2 | d2,-1 | d2,0 | d2,1 | d2,2 | d2,3 |
| d3,-3 | d3,-2 | d3,-1 | d3,0 | d3,1 | d3,2 | d3,3 |
Anisotropic weights
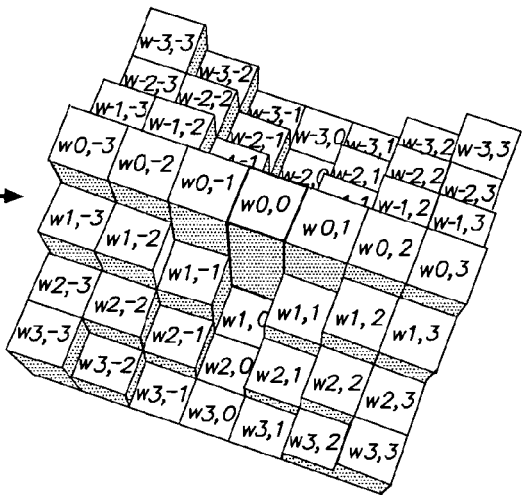
LUT
| e-3,-3 | e-3,-2 | e-3,-1 | e-3,0 | e-3,1 | e-3,2 | e-3,3 |
|---|---|---|---|---|---|---|
| e-2,-3 | e-2,-2 | e-2,-1 | e-2,0 | e-2,1 | e-2,2 | e-2,3 |
| e-1,-3 | e-1,-2 | e-1,-1 | e-1,0 | e-1,1 | e-1,2 | e-1,3 |
| e0,-3 | e0,-2 | e0,-1 | 0 | e0,1 | e0,2 | e0,3 |
| e1,-3 | e1,-2 | e1,-1 | e1,0 | e1,1 | e1,2 | e1,3 |
| e2,-3 | e2,-2 | e2,-1 | e2,0 | e2,1 | e2,2 | e2,3 |
| e3,-3 | e3,-2 | e3,-1 | e3,0 | e3,1 | e3,2 | e3,3 |
$\Rightarrow \quad \Sigma W \times E = h_{0,0}$
FIG. 9

METHOD OF GENERATING A MULTISCALE CONTRAST ENHANCED IMAGE

FIELD OF THE INVENTION

The present invention relates to a method for enhancing the image quality of an image that is represented by a digital signal.

BACKGROUND OF THE INVENTION

Commonly images represented by a digital signal such as medical images are subjected to image processing during or prior to displaying or hard copy recording.

The conversion of grey value pixels into values suitable for reproduction or displaying may comprise a multi-scale image processing method (also called multi-resolution image processing method) by means of which the contrast of the image is enhanced.

According to such a multi-scale image processing method an image, represented by an array of pixel values, is processed by applying the following steps. First the original image is decomposed into a sequence of detail images at multiple scales and occasionally a residual image. Next, the pixel values of the detail images are modified by applying to these pixel values at least one conversion function. Finally, a processed image is computed by applying a reconstruction algorithm to the residual image and the modified detail images.

There are limits for the behavior of the conversion functions. Grey value transitions in the image can be distorted to an extent that the appearance becomes unnatural if the conversion functions are excessively non-linear. The distortions are more pronounced in the vicinity of significant grey level transitions, which may result in overshoots at step edges and loss of homogeneity in regions of low variance facing strong step edges. The risk of creating artifacts becomes more significant for CT images since they have sharper grey level transitions, e.g. at the interface of soft tissue and contrast media. One has to be careful using the multi-scale techniques on CT images.

A multi-scale contrast enhancement algorithm which results in a contrast enhanced image while preserving the shape of the edge transitions has been described in co-pending European patent application 06 125 766.3 filed Dec. 11, 2006.

In one embodiment of this method translation difference images of at least one approximation image of the image are created at one or multiple scales. Next, translation difference images are non linearly modified. Then at least one enhanced center difference image at a specific scale is computed by combining modified translation difference images at that scale or at a smaller scale. Spatially-localized phenomena derived from the image can be used to create enhanced center difference images.

Finally an enhanced image is computed by applying a reconstruction algorithm to the enhanced center difference images.

Generally isotropic filters are used in the decomposition and reconstruction process and an omni-directional enhancement is applied to the coefficients in the detail images.

The isotropic design concept is justified in those cases where the image statistics are stationary, meaning that every patch in the image is generated by the same random process as every other patch of the image. However, if one looks at a region of the image where an edge or a line or a homogeneous region might be visible, it is clear that the underlying process is not stationary and changes from patch to patch.

It is an object of the present invention to overcome the limitations of the prior art.

Such a limitation is the inability to facilitate selective detection and enhancement of image features, for example chromosome images wherein one wants to enhance chromosome bands at a particular scale and in certain orientation and position for designated DNA analysis.

SUMMARY OF THE INVENTION

The above-described aspects are realized by a method of enhancing the contrast of an image that is represented by a digital signal, comprising creating at least one approximation image at one or multiple scales on a computer, an approximation image at a scale representing the grey values of said image in which all details at that scale have been omitted, creating translation difference images by pixel-wise subtracting the values of an approximation image at scale s and the values of a translated version of said approximation image on a computer, applying a non-linear modification to the values of said translation difference image(s) on a computer, on a computer, computing at least one enhanced center difference image at a specific scale by combining said modified translation difference images at that scale or a smaller scale with weights $W_{i,j}$, said weights $W_{ij}$, being selected such that, if no enhancement is performed, an equivalent of a multi-scale decomposition of said image is obtained, on a computer, computing an enhanced image by applying a reconstruction algorithm to the enhanced center difference images, steering said non-linear modification of the values of the translation difference images by the values of an orientation map, which comprises for each pixel on a specific scale a local direction of interest, with a computer. Specific features for preferred embodiments of the invention include wherein said non-linear modification of the values of the translation difference images is steered by the values of an orientation map which comprises for each pixel on a specific scale a local direction of interest and at least one of said modified translation difference images is subjected to an anisotropic weighing steered by said orientation map, wherein a translation difference image at a specific scale is computed out of an approximation image at the same scale, wherein all of said translation difference images are computed out of the original image, wherein the center difference images are identical to the multi-scale detail images, wherein said image is a mammographic image, and wherein said image is a CT image.

In the context of the present invention specific terms are defined as follows:

Multi-Scale Decomposition Mechanism:

A multi-scale (or multi-resolution) decomposition of an image is a process that computes detail images of the image at multiple scales. A multi-scale decomposition mechanism generally involves filter banks for computing the detail images. Well-known techniques are for example: the Laplacian pyramid, the Burt pyramid, the Laplacian stack, the wavelet decomposition, QMF filter banks...

Approximation Image:

An approximation image is a grey value image that represents the original grey value image at the same or a larger scale, or at the same or a lower resolution. An approximation image at a specific scale is equivalent to the original grey value image in which all details at that scale have been omitted (Mallat S. G., "A Theory for Multiresolution Signal Decomposition: The Wavelet Representation", IEEE Trans. On Pattern Analysis and Machine Intelligence, vol. 11, no. 7, Jul. 1989).

Detail Image:

A detail image is defined as a pixel map that represents the difference between an approximation image at a certain scale and an approximation image at a smaller scale.

Conversion Operator:

A conversion operator is an operator which generates the pixel-wise modification of the detail pixel values as an intermediate step to create a contrast enhanced version of the grey value image. Such an operator has for example been described in European patent EP 527 525. The modification is defined by a conversion function and can e.g. be implemented as a look up table or as a multiplicative amplification.

Translation Difference Image:

The translation difference images at a scale s are a measurement of elementary contrast in each pixel of an approximation image at scale s. They can be computed by taking the difference of the approximation image at that scale s and a translated version. Other computations for elementary contrast are possible, e.g. the ratio of pixel with a neighboring pixel can be used in case the processing steps are preceded by an exponential transform and followed by a log transform.

Center Difference Image:

A center difference image is computed by applying a combining operator (for example the summation) to translation difference images. The combining operator can be a linear or non-linear function of corresponding pixel values in the translation difference images.

Orientation Map:

The orientation map at a specific scale is a representation for each pixel within the image of a prominent or locally dominant direction typically associated with significant image structures.

Possible representations of orientation maps are vector maps, the polar representation (angle and amplitude of the preferred direction in each pixel), Cartesian representation (horizontal and vertical components of the preferred direction in each pixel). (In a more simple representation only an angle is defined and abstraction is made of the amplitude of the direction vectors.)

Many implementations of computing orientation maps have been described varying from complex mechanisms such as the n-th order gauge coordinates, the directions of isophotes (lines in the image connecting points of equal intensity), to more straightforward implementations such as the combination of the horizontal and vertical gradient image.

The orientation map can also be computed out of detail images. An example is the detail information generated by the edge wavelets wherein the detail information represents the localization of edges at different scales.

The multi-scale image processing based on the translation difference images that are enhanced and combined to center differences creates the possibility to tune the enhancement to directions present in the digital image.

The anisotropic multi-scale image processing is based on an orientation map as described higher that defines the preferred, local direction of interest for each pixel on a specific scale.

The orientation can be computed out of the approximation images, as well as out of the detail images.

Further on two ways to implement the anisotropic multi-scale image enhancement are described: steerable enhancement of the translation difference images and anisotropic weighting of the enhanced translation difference images. Both implementations can either be applied independently of each other or either applied together to create enhanced center differences out of the translation difference images.

The present invention is generally implemented as a computer program product adapted to carry out the method of any of the claims when run on a computer and is stored on a computer readable medium.

The methods of the present invention can be applied for enhancing the image quality of medical images such as mammographic images, images obtained by computed tomography etc.

Further advantages and embodiments of the present invention will become apparent from the following description and drawings.

BRIEF DESCRIPTION OF THE DRAWINGS

FIG. 7 is a legend pertaining to the symbols used in the above figures, FIG. 8 illustrates the computation of the enhanced center differences by making the enhancement of the translation differences dependent on their orientation, FIG. 9 illustrates the computation of the enhanced center differences by making their weights orientation dependent.

DETAILED DESCRIPTION OF THE INVENTION

Figure 1:
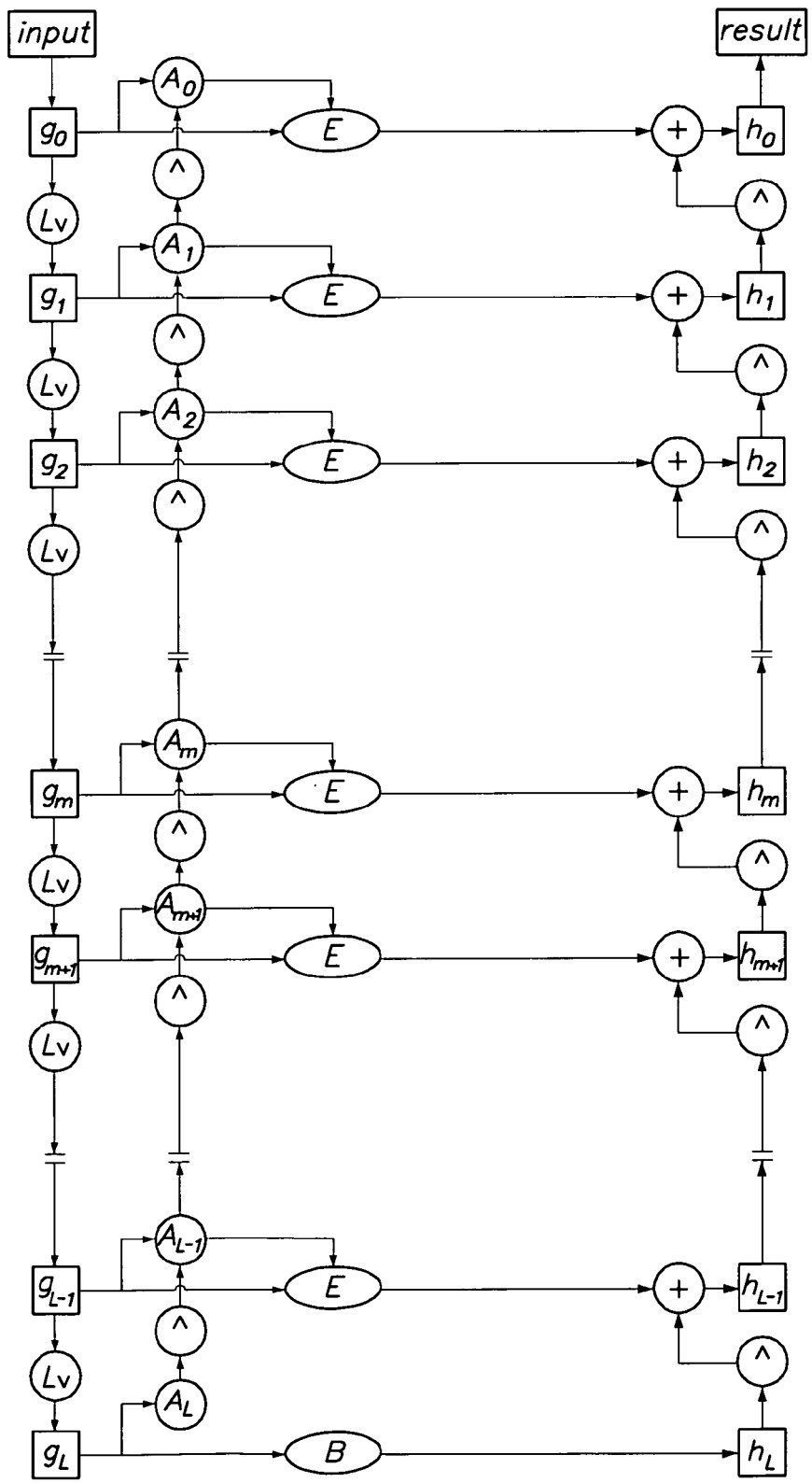
FIG. 1 shows a multi-resolution image processing scheme with the center difference images computed out of approximation images at the same scale.

The contrast enhancement algorithm of the present invention is applicable to all multi-scale detail representation methods from which the original image can be computed by applying the inverse transformation.

It is applicable to the reversible multi-scale detail representation that can be computed as a weighted sum of translation difference images.

The weighing factors and the translation offsets of the translation difference images can be deducted from the multi-scale decomposition in such a way that the resulting weighted sum of the translation difference images is identical to the detail pixel values.

For these multi-scale detail representations the contrast can be enhanced by applying the conversion operator to the translation differences before the weighted sum is computed.

To compute the weighted sum of translation difference images, the approximation image at the same scale (or resolution level) or the approximation images at the smaller scales (or finer resolution levels) can be used.

State-of-the-art multi-scale contrast enhancement algorithms decompose an image into a multi-scale representation comprising detail images representing detail at multiple scales and a residual image.

Some of the important multi-scale decompositions are the wavelet decomposition, the Laplacian-of-Gaussians (or LoG decomposition), the Difference-of-Gaussians (or DoG) decomposition and the Burt pyramid.

The wavelet decomposition is computed by applying a cascade of high-pass and low-pass filters followed by a sub-sampling step.

The high-pass filter extracts the detail information out of an approximation image at a specific scale.

In the Burt pyramid decomposition the detail information is extracted out of an approximation image at scale k by subtracting the upsampled version of the approximation image at scale k+1.

In a state of the art methods as the one disclosed in EP 527 525 a contrast enhanced version of the image is created by conversion of the pixel values in the detail images followed by multi-scale reconstruction.

All above implementations of multiscale decomposition have a common property. Each pixel value in the detail images can be computed out of an approximation image by combining the pixel values to in a moving neighborhood.

In the above cases the combining function is a weighted sum.

For the wavelet decomposition the pixel values in the detail image at scale k are computed as:

$$d_{k+1} = \downarrow(h_d * g_k)$$

$$g_{k+1} = \downarrow(l_d * g_k)$$

with $h_d$ a high-pass filter, $l_d$ a low-pass filter, * the convolution operator and $\downarrow$ the subsampling operator (i.e. leaving out every second row and column).

For the wavelet reconstruction the enhanced approximation image at scale k is computed as:

$$h_k = l_r * (\uparrow h_{k+1}) + h_r * (\uparrow f(d_{k+1}))$$

with $h_r$ a high-pass filter, $l_r$ a low-pass filter and $\uparrow$ the upsampling operator (i.e. inserting pixels with value 0 in between any two rows and columns).

For the Burt decomposition the pixel values in the detail image at scale k are computed as:

$$d_k = g_k - 4g * (\uparrow g_{k+1})$$

or $$d_k = g_k - 4g * (\uparrow(\downarrow(g * g_k)))$$

or $$d_k = (1 - 4g * (\uparrow(\downarrow g))) * g_k$$

with g a Gaussian low-pass filter and 1 the identity operator.

For the Burt reconstruction the enhanced approximation image at scale k is computed as:

$$h_k = 4g * (\uparrow h_{k+1}) + f(d_k)$$

with f(x) the conversion operator.

The Multi-Scale Detail Pixel Values as Weighted Sums

Suppose that in the Burt multi-scale decomposition a 5×5 Gaussian filter is used with coefficients $w_{k,l}$ with $k=-2, \ldots 2$ and $l=-2, \ldots, 2$, the subsampling operator removes every second row and column and the upsampling operator inserts pixels with value 0 in between any two rows and columns.

The pixel at position i,j in the approximation image $g_{k+1}$ is computed as:

$$g_{k+1}(i,j) = \sum_{s=-2}^{2} \sum_{t=-2}^{2} w_{s,t} g_k(2i+s, 2j+t)$$

The pixel at position i,j in the upsampled image $u_k$ is computed as:

$$u_k(i,j) = \begin{cases} \sum_{s=-2}^{2} \sum_{t=-2}^{2} w_{s,t} g_k(i+s, j+t) & \text{if } i \text{ and } j \text{ are even} \\ 0 & \text{otherwise} \end{cases}$$

The pixel at position i,j in the upsampled, smoothed image $gu_k$ is computed as:

$$gu_k(i,j) =$$

$$\begin{cases} \sum_{m=\{-2,0,2\}} \sum_{n=\{-2,0,2\}} w_{m,n} \sum_{s=-2}^{2} \sum_{t=-2}^{2} w_{s,t} g_k(i+s+m, j+t+n) & \text{if } i \text{ and } j \text{ are even} \\ \sum_{m=\{-1,1\}} \sum_{n=\{-2,0,2\}} w_{m,n} \sum_{s=-2}^{2} \sum_{t=-2}^{2} w_{s,t} g_k(i+s+m, j+t+n) & \text{if } i \text{ is odd and } j \text{ is even} \\ \sum_{m=\{-2,0,2\}} \sum_{n=\{-1,1\}} w_{m,n} \sum_{s=-2}^{2} \sum_{t=-2}^{2} w_{s,t} g_k(i+s+m, j+t+n) & \text{if } i \text{ is even and } j \text{ is odd} \\ \sum_{m=\{-1,1\}} \sum_{n=\{-1,1\}} w_{m,n} \sum_{s=-2}^{2} \sum_{t=-2}^{2} w_{s,t} g_k(i+s+m, j+t+n) & \text{if } i \text{ and } j \text{ are odd} \end{cases}$$

Finally, the pixel at position i,j in the detail image $d_k$ is computed as:

$$d_k(i,j) = \begin{cases} g_k(i,j) - 4 \sum_{m=\{-2,0,2\}} \sum_{n=\{-2,0,2\}} w_{m,n} \sum_{s=-2}^{2} \sum_{t=-2}^{2} w_{s,t} g_k(i+s+m, j+t+n) & \text{if } i \text{ and } j \text{ are even} \\ g_k(i,j) - 4 \sum_{m=\{-1,1\}} \sum_{n=\{-2,0,2\}} w_{m,n} \sum_{s=-2}^{2} \sum_{t=-2}^{2} w_{s,t} g_k(i+s+m, j+t+n) & \text{if } i \text{ is odd and } j \text{ is even} \\ g_k(i,j) - 4 \sum_{m=\{-2,0,2\}} \sum_{n=\{-1,1\}} w_{m,n} \sum_{s=-2}^{2} \sum_{t=-2}^{2} w_{s,t} g_k(i+s+m, j+t+n) & \text{if } i \text{ is even and } j \text{ is odd} \\ g_k(i,j) - 4 \sum_{m=\{-1,1\}} \sum_{n=\{-1,1\}} w_{m,n} \sum_{s=-2}^{2} \sum_{t=-2}^{2} w_{s,t} g_k(i+s+m, j+t+n) & \text{if } i \text{ and } j \text{ are odd} \end{cases}$$

Generally, the pixel at position i,j in the detail image $d_k$ can be computed as a weighted sum of pixels in the approximation image at the same or smaller scale k, k−1, k−2, ...:

$$d_k(i,j) = g_l(ri, rj) - \sum_m \sum_n v_{m,n} g_l(ri+m, rj+n)$$

with $l \in \{0, \ldots, k\}$ and $r = \text{subsampling\_factor}^{(l-k)}$
Because $$\sum_m \sum_n v_{m,n} = 1$$

the pixel at position i,j in the detail image $d_k$ can be computed as:

$$d_k(i,j) = g_l(ri, rj) - \sum_m \sum_n v_{m,n} g_l(ri+m, rj+n)$$

$$d_k(i,j) = \sum_m \sum_n v_{m,n} g_l(ri, rj) - \sum_m \sum_n v_{m,n} g_l(ri+m, rj+n)$$

$$d_k(i,j) = c_k(i,j) = \sum_m \sum_n v_{m,n}(g_l(ri, rj) - g_l(ri+m, rj+n))$$

The term $g_l(ri,rj) - g_l(ri+m, rj+n)$ is called a translation difference.

It expresses the difference in pixel value between a central pixel and a neighboring pixel in an approximation image. It is a measure of local contrast.

The weighted sum of the translation differences is called a centre difference $c_k(i,j)$.

Also for the wavelet decomposition the pixel values in the detail images can be computed as a weighted sum of pixels in an approximation image. The pixel values in the detail image $d_{k+1}$ are computed by applying to the approximation image $g_k$ a high-pass filter h with filter coefficients $h_{m,n}$. This filtering operation is followed by a subsampling operator removing every second row and column.

$$d_{k+1} = \downarrow (h * g_k)$$

The pixel at position i,j in the detail image $d_{k+1}$ is computed as:

$$d_{k+1}(i,j) = \sum_m \sum_n h_{m,n} g_k(2i+m, 2j+n)$$

Because for a high-pass filter the sum of the filter coefficients equals zero:

$$\sum_m \sum_n h_{m,n} = 0$$

or $$\sum_m \sum_n h_{m,n} g_k(2i, 2j) = 0$$

the pixel at position i,j in the detail image $d_{k+1}$ can be computed as:

$$d_{k+1}(i,j) = \sum_m \sum_n h_{m,n} g_k(2i+m, 2j+n) - \sum_m \sum_n h_{m,n} g_k(2i, 2j)$$

$$d_{k+1}(i,j) = \sum_m \sum_n h_{m,n}(g_k(2i+m, 2j+n) - g_k(2i, 2j))$$

$$d_{k+1}(i,j) = -\sum_m \sum_n h_{m,n}(g_k(2i, 2j) - g_k(2i+m, 2j+n))$$

The term $g_k(2i,2j) - g_k(2i+m, 2j+n)$ represents a translation difference.

In a similar way it can be proven that the detail images in other multi-scale decomposition methods can also be represented as a combination of translation difference images.

The Conversion Operation

In state-of-the-art methods like the one disclosed in EP 527 525 contrast enhancement is obtained by applying a conversion operator f(x) to the detail image $d_k$ or, equivalently:

$$f(d_k(i,j)) = f\left(g_l(ri, rj) - \sum_m \sum_n v_{m,n} g_l(ri+m, rj+n)\right)$$

An example of such a conversion operator is the sigmoid function. Another example of such conversion operator is the contrast enhancement function like the one disclosed in EP 527 525. The shape of the conversion operator depends on the specific requirements of the enhancement which is intended to amplify the low-value detail pixel more than the high-value detail pixels.

The conversion step may cause deformations of the shape of the edge transitions in the reconstructed, contrast enhanced image. The reason is the non-linearity of the conversion function.

Generally, the following applies to non-linear functions:

$$f(x+y) \neq f(x) + f(y)$$
or
$$f\left(\sum_i x_i\right) \neq \sum_i f(x_i)$$

State-of-the-art algorithms first compute the pixel values in the detail image $d_k$ as weighted sums and apply the conversion step afterwards.

By rewriting the pixel values in the detail image $d_k$ as a to weighted sum of translation differences, it is possible to apply the conversion step before the summation instead of afterwards.

Contrast enhancement is now obtained by applying the conversion step to the translation differences:

$$f(d_k(i,j)) = \sum_m \sum_n v_{m,n} f(g_l(ri, rj) - g_l(ri+m, rj+n))$$

In this way the shape of the edge transitions is better preserved in the contrast enhanced, reconstructed image.

If for every scale k the detail image at that scale is computed out of the full resolution image $g_0$, and enhancement is applied to the center differences, then the shapes of the edge transitions are best preserved after reconstruction.

Figure 2:
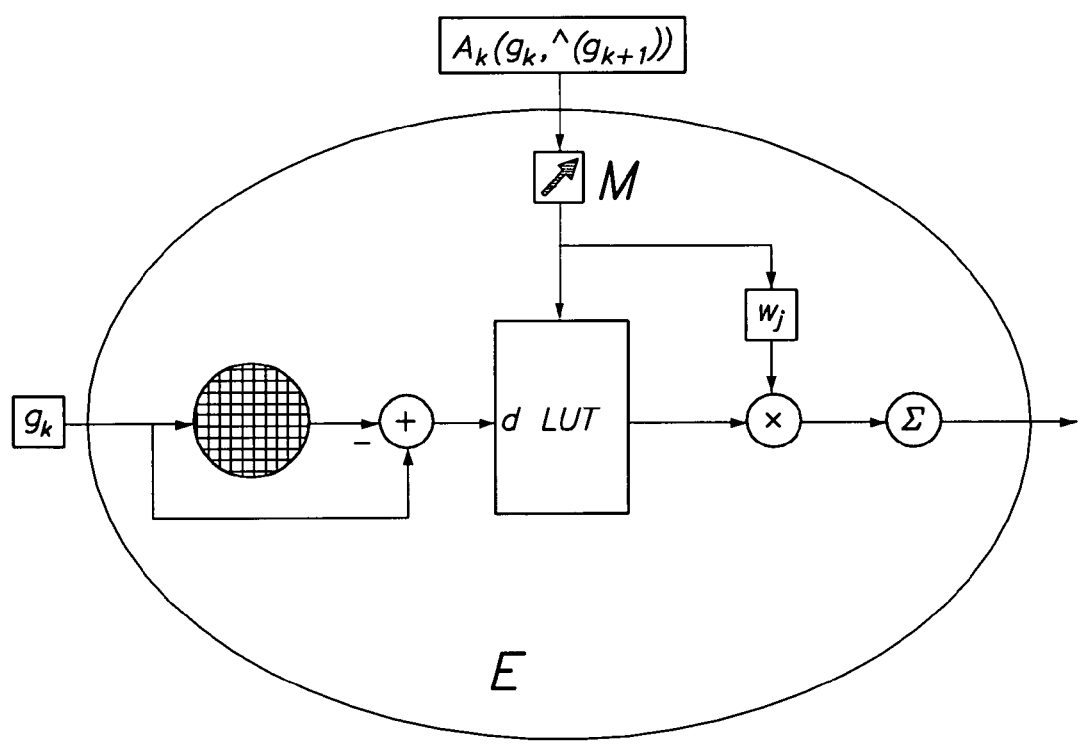
FIG. 2 is a detailed view of the advanced enhancement functional block of FIG. 1, FIGS. 3 and 5 illustrate different implementations of the multi-resolution image processing method according to the present invention.
Figure 3:
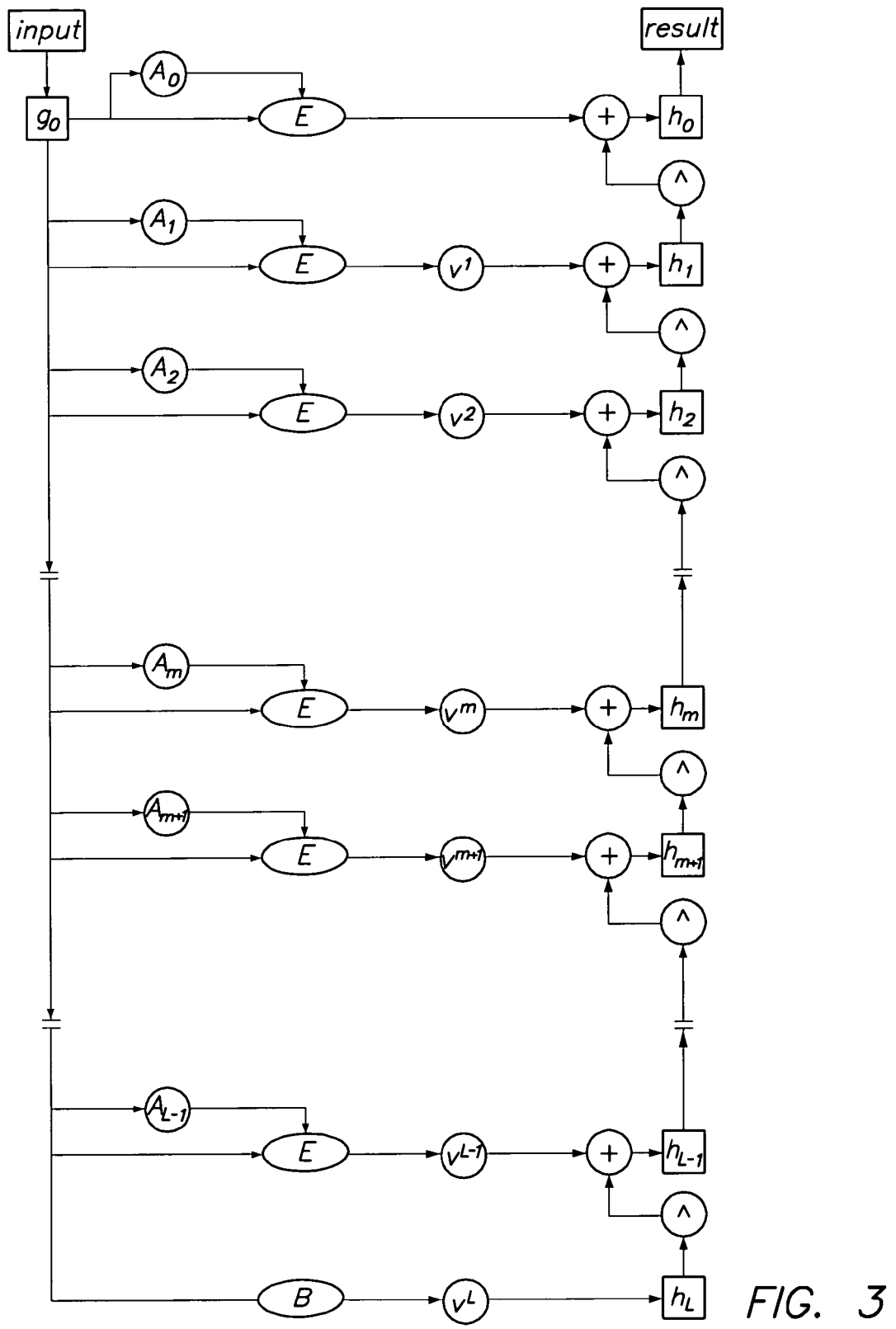
Figure 4:
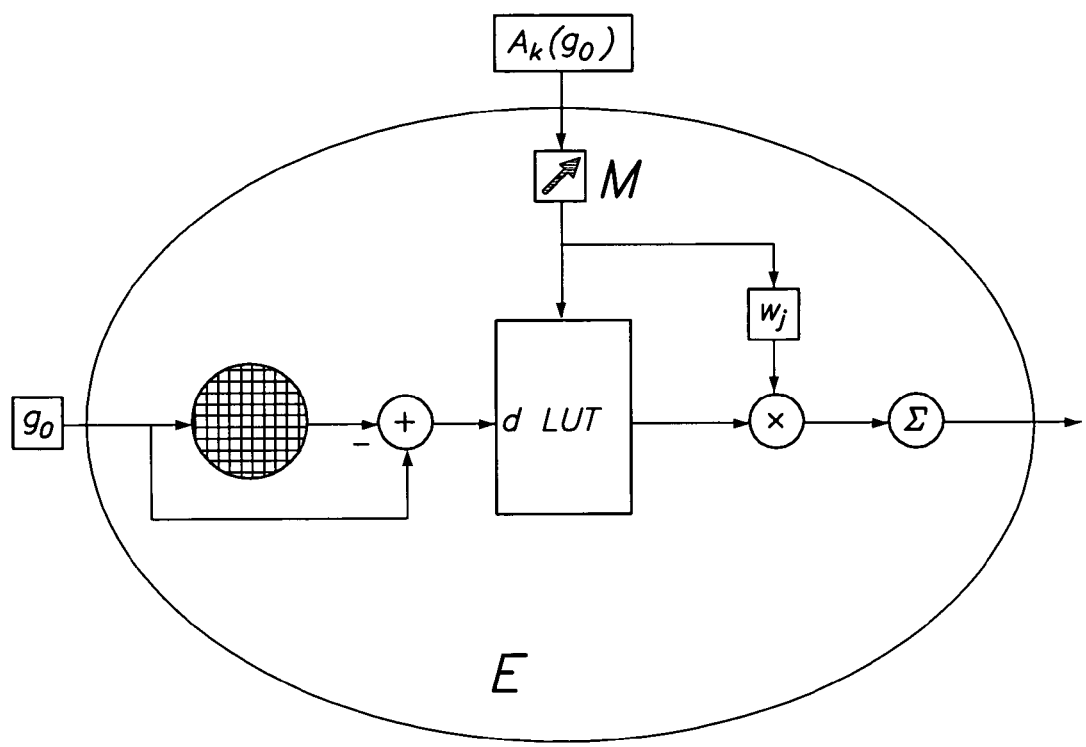
FIG. 4 illustrates the image enhancement step of the multi-resolution image processing method illustrated in FIG. 3.
Figure 5:
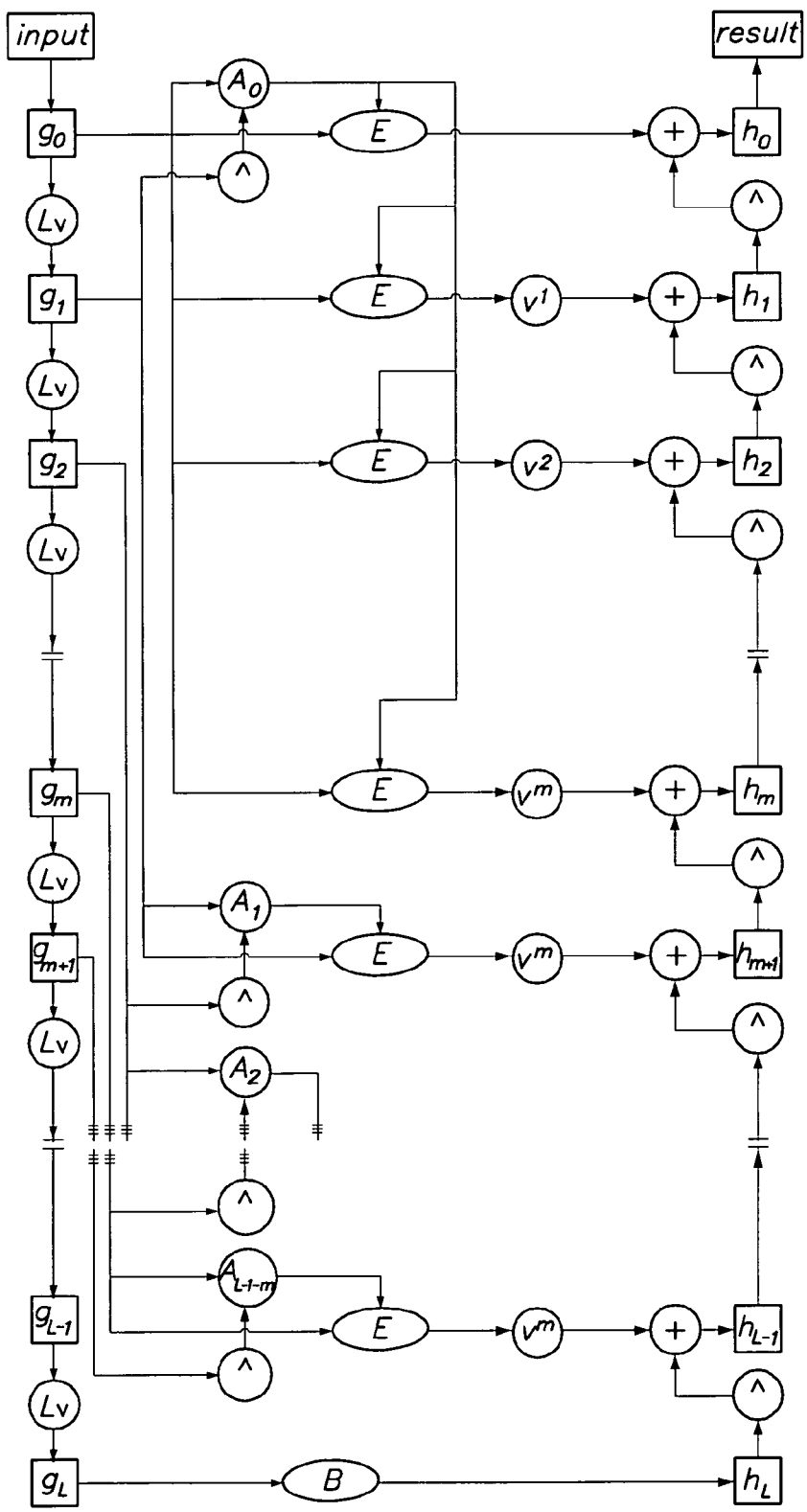
Figure 6:
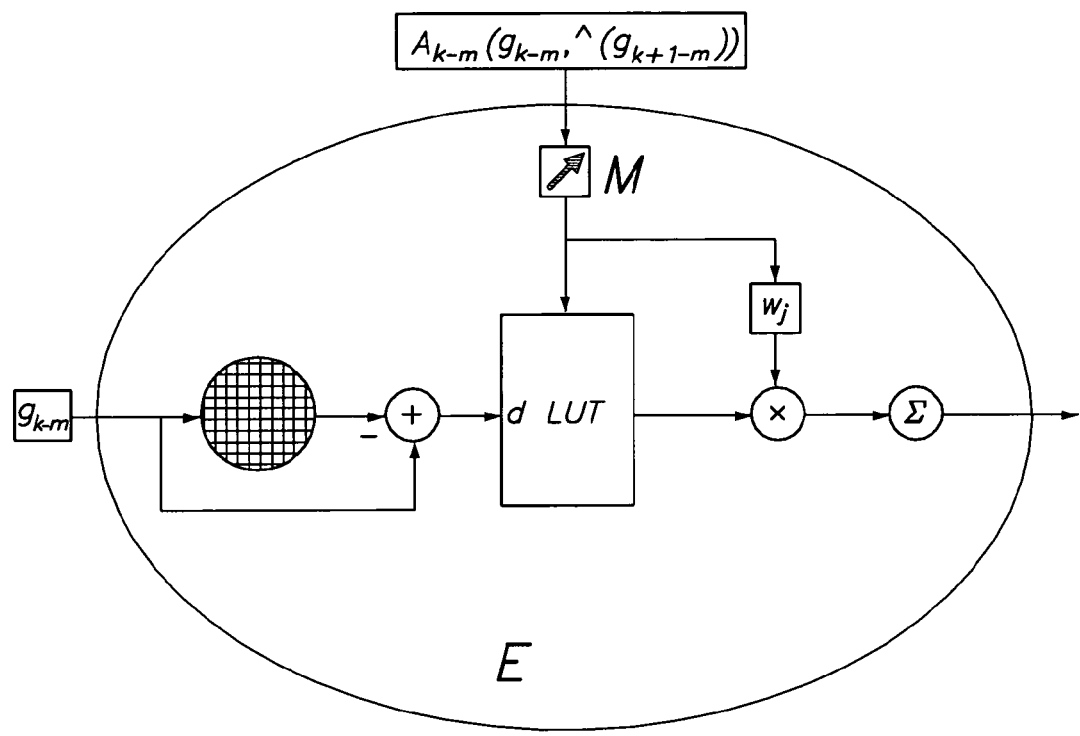
FIG. 6 illustrates the image enhancement step of the multi-resolution image processing method illustrated in FIG. 5.

Different implementations of the present invention are illustrated in FIGS. 1, 3 and 5 with the corresponding enhancement steps being illustrated in FIGS. 2, 4 and 6.

FIG. 1 shows a multi-scale image processing scheme with the center difference images computed out of the approximation images at the same scale. This figure shows an extended scheme for multi-resolution image processing provided with a control path.

Out of the approximation images at different scales the center difference images are computed and enhanced in steered enhancement block E. The output of block E is subjected to a reconstruction process.

FIG. 2 illustrates the steered enhancement block E making use of orientation maps derived from approximation images.

Functional Blocks $A_k$

These filtering blocks can be used to enhance the approximation images or to compute certain characteristics out of the approximation images, typically a horizontal and vertical gradient image. These characteristics can be used to compute the orientation maps.

In a specific embodiment the approximation images are enhanced before an orientation map is computed out of it. This can for example be performed by additional smoothing of the approximation images to reduce the influence of noise and irrelevant small image structures on the orientation map computation.

Also other characteristics can be computed out of the approximation images, for example a horizontal and vertical gradient image. In a next step, i.e. the orientation map generator (described below), both images can be combined to compute the orientation map.

Orientation Map Generator  M

The orientation map at a specific scale is a representation for each pixel within the image of a prominent or locally dominant direction of significant image structures.

Possible representations of orientation maps have been described higher.

Anisotropic Enhancement

The anisotropic enhancement is performed by either (1) a steered enhancement of the translation difference images, whereby the steering depends on the contents of the orientation map, or (2) by an anisotropic weighing (coefficients $w_j$) of the enhanced translation difference images. Both implementations can either be applied independently of each other or either applied together to create enhanced center differences out of the translation difference images.

Steerable Enhancement of the Translation Difference Images

Each enhanced center difference is computed as a combination of enhanced translation difference images.

A translation difference is the difference in pixel value in an approximation image of a central pixel with a pixel in its local neighborhood.

By using the spatial orientation of these 2 pixels w.r.t. each other, one can adapt the enhancement to modify translation differences more or less in accordance to a predefined orientation of interest.

Example (see FIG. 8—Different Levels in the 3D Image Represent Different Values):

Suppose a noisy edge is present in a region of interest within the image.

In order to combine enhancement of the edge while at the same time reducing the impact of noise, one could enhance the translation differences with an orientation perpendicular to the edge orientation and attenuate the translation differences parallel to the edge.

The latter difference images represent unwanted, noise image structure, while the first ones represent the local contrast over the edge. Translation difference images with an orientation in between will undergo an intermediate enhancement.

Starting from the approximation image $g_{k-m}$ the orientation map M is computed by combining the horizontal and vertical gradients of image $g_{k-m}$. To diminish the influence of the noise to the gradient computations, the approximation image $g_{k-m}$ is filtered using e.g. a median filter resulting in the filtered image $A_k(g_{k-m})$.

The vertical en horizontal first-order gradients within the image are computed using the kernel $\{1, -1\}$ in horizontal and vertical direction.

If the orientation map M represents e.g. the local direction of significant image structures (or perpendicular to it), the map is computed as the inverse tangent function of the ratio of the vertical and the horizontal gradient:

$$M(i,j) = \tan^{-1}\left(\frac{\text{ver\_grad}(A_k(g_{k-m}(i,j-1)), A_k(g_{k-m}(i,j+1)))}{\text{hor\_grad}(A_k(g_{k-m}(i-1,j)), A_k(g_{k-m}(i+1,j)))}\right)$$

This orientation map M is used as steering input for the LUT operator.

The LUT operator has 2 inputs, the translation differences and the orientation map, and generates the enhanced translation differences as output.

An example of such a steerable LUT operator $\text{LUT}(d_k, M(i,j))$ is the combination of a conversion operator $f(d_k)$ with an extra orientation dependent amplification function Amp($\theta$) with $\theta$ function of the orientation map $M(i,j)$.

Examples of the conversion operator $f(d_k)$ are the sigmoid function and a contrast enhancement function like the one disclosed in EP 527 525. The shape of the conversion operator depends on the specific requirements of the enhancement which is intended to amplify the low-value translation differences more than the high-value translation differences.

The orientation dependent amplification function returns typically a maximum amplification factor along a preferred direction, a minimum amplification factor for the orientation perpendicular to the preferred direction and gradually varying amplification factors for the intermediate orientations.

An example of such an orientation dependent amplification function is the cosine function multiplied with a constant amplification factor b. As input for this function the difference can be taken between the local direction of interest as specified by the orientation map $M(i,j)$ and the orientation of the translation difference at position $(m,n)$ w.r.t. the center pixel of interest:

Amp($\theta$)=$b \cos(\theta)$ with $\theta = M(i,j) - \text{angle}(d_k(i+m, j+n))$ and
$\text{angle}(d_k(i+m, j+n)) = \tan^{-1}(n/m)$ More advanced implementations of the steerable LUT operators are multi-dimensional look-up tables.

The results of the LUT operator are enhanced translation differences with an extra enhancement of the translation differences along the direction as specified by $M(i,j)$ (indicated in FIG. 8 by the darkness of the grey background of the enhanced translation differences $e_{m,n}$).

The enhanced translation differences are then combined using isotropic weights $w_{m,n}$ to compute enhanced center difference at position $i, j$.

The weights $w_{m,n}$ are computed such that the weighted sum of the unenhanced translation differences matches exactly the detail pixel value as would be generated by straightforward application of the Burt decomposition.

Anisotropic Weighting of the Enhanced Translation Difference Images

To compute the center differences out of the translation difference images at each position (x, y), the weighted sum is taken of the translation differences. In European patent application 06 125 766.3 files Dec. 11, 2006, the weights are isotropic and no preferential direction is defined.

By changing the weights in accordance to their spatial orientation w.r.t. the central weight, one can change the importance of translation differences along a predefined orientation in the total sum.

Example (see FIG. 9—Different Levels in the 3D Image Represent Different Values):

Suppose a noisy edge is present in a region of interest within the image.

If an enhancement of this edge is wanted while reducing the noise, one could apply relatively higher weights to the enhanced translation differences with an orientation perpendicular to the edge orientation and relatively lower weights to the enhanced translation differences parallel to the edge. The latter translation differences represent unwanted, noise image structure, while the first ones represent the local contrast over the edge. Enhanced translation differences with an orientation in between will be taken into account with intermediate weights.

The computation of the orientation map M out of an approximation image $g_{k-m}$ is explained in detail in the first embodiment.

Instead of using the orientation map M as steering input for the LUT operator, the orientation map M can also be used as steering parameter to create anisotropic weights $w_{m,n}$.

In this embodiment the LUT operator depends only on the unenhanced translation differences, e.g. the conversion operator $f(d_k)$ as specified above.

For each position i,j within the image, the isotropic weights $w_{l,n}$ are modified w.r.t. their orientation to the local direction of interest as specified by the orientation map M(i, j).

As modification operator the mechanism of an amplification function is used as explained in the first embodiment.

The isotropic weights $w_{m,n}$ are multiplied by an orientation dependent amplification function that typically returns a maximum multiplication factor along a preferred direction, a minimum multiplication factor for the orientation perpendicular to the preferred direction and a gradually varying multiplication factors for the intermediate orientations (indicated in FIG. 9 by the darkness of the grey background of the weights $w_{m,n}$).

An example of such an orientation dependent amplification function is the cosine function. As input for this function the difference can be taken between the local direction of interest as specified by the orientation map M(i,j) and the orientation of the weights at position (m,n) w.r.t. the center position (0,0):

$$Amp(\theta) = \cos(\theta)$$

with $$\theta = M(i,j) - \text{angle}(w_k(m,n)) \text{ and angle}(w_k(m,n)) = \tan^{-1}(n/m)$$

Furthermore the anisotropic weights are normalized such that the sum of the weights equals one.

In the last step the center difference is computed by combining the enhanced translation differences using the anisotropic weights. This results in relatively higher weights for the enhanced translation differences oriented along the local direction of interest as specified by the orientation map M(i, j).

Combinations of the enhancement methods illustrated in FIGS. 8 and 9 are also possible.

The invention claimed is:

1. A non-transitory computer readable medium comprising computer executable program code adapted to enhance the contrast of an image that is represented by a digital signal by performing a method comprising:

creating at least one approximation image at one or multiple scales, an approximation image at a scale representing the grey values of said image in which all details at that scale have been omitted, creating translation difference images by pixel-wise subtracting the values of an approximation image at scale s and the values of a translated version of said approximation image, applying a non-linear modification to the values of said translation difference image(s), computing at least one enhanced center difference image at a specific scale by combining said modified translation difference images at that scale or a smaller scale with weights $W_{i,j}$, said weights $W_{i,j}$, being selected such that, if no enhancement is performed, an equivalent of a multi-scale decomposition of said image is obtained, computing an enhanced image by applying a reconstruction algorithm to the enhanced center difference images, and steering said non-linear modification of the values of the translation difference images by the values of an orientation map, which comprises for each pixel on a specific scale a local direction of interest.

2. A method of enhancing the contrast of an image that is represented by a digital signal, comprising creating at least one approximation image at one or multiple scales on a computer, an approximation image at a scale representing the grey values of said image in which all details at that scale have been omitted, creating translation difference images by pixel-wise subtracting the values of an approximation image at scale s and the values of a translated version of said approximation image on a computer, applying a non-linear modification to the values of said translation difference image(s) on a computer, on a computer, computing at least one enhanced center difference image at a specific scale by combining said modified translation difference images at that scale or a smaller scale with weights $W_{i,j}$, said weights $W_{i,j}$, being selected such that, if no enhancement is performed, an equivalent of a multi-scale decomposition of said image is obtained, on a computer, computing an enhanced image by applying a reconstruction algorithm to the enhanced center difference images, and steering said non-linear modification of the values of the translation difference images by the values of an orientation map, which comprises for each pixel on a specific scale a local direction of interest, with a computer.

3. A method according to claim 2 wherein said non-linear modification of the values of the translation difference images is steered by the values of an orientation map which comprises for each pixel on a specific scale a local direction of interest and at least one of said modified translation difference images is subjected to an anisotropic weighing steered by said orientation map.

4. A method according to claim 2 wherein a translation difference image at a specific scale is computed out of an approximation image at the same scale.

5. A method according to claim 2 wherein all of said translation difference images are computed out of the original image.

6. A computer readable medium according to claim 1 wherein said non-linear modification of the values of the translation difference images is steered by the values of an orientation map which comprises for each pixel on a specific scale a local direction of interest and at least one of said modified translation difference images is subjected to an anisotropic weighing steered by said orientation map.

7. A method according to claim 2 wherein the center difference images are identical to the multi-scale detail images.

8. A method according to claim 2 wherein said image is a mammographic image.

9. A method according to claim 2 wherein said image is a CT image.

10. A computer program product stored on a non-transitory computer readable medium adapted to carry out method of enhancing the contrast of an image that is represented by a digital signal when run on a computer, the method comprising:

creating at least one approximation image at one or multiple scales, an approximation image at a scale representing the grey values of said image in which all details at that scale have been omitted, creating translation difference images by pixel-wise subtracting the values of an approximation image at scale s and the values of a translated version of said approximation image, applying a non-linear modification to the values of said translation difference image(s), computing at least one enhanced center difference image at a specific scale by combining said modified translation difference images at that scale or a smaller scale with weights $W_{i,j}$, said weights $W_{i,j}$, being selected such that, if no enhancement is performed, an equivalent of a multi-scale decomposition of said image is obtained, computing an enhanced image by applying a reconstruction algorithm to the enhanced center difference images, and steering said non-linear modification of the values of the translation difference images by the values of an orientation map, which comprises for each pixel on a specific scale a local direction of interest.

11. A computer readable medium according to claim 1 wherein translation difference image at a specific scale is computed out of an approximation image at the same scale.

12. A method according to claim 2 wherein at least one of said enhanced center difference images is computed by anisotropic weighing of values of the enhanced translation difference image with weights steered by said orientation map.

13. A computer program product according to claim 10 wherein said non-linear modification of the values of the translation difference images is steered by the values of an orientation map which comprises for each pixel on a specific scale a local direction of interest and at least one of said modified translation difference images is subjected to an anisotropic weighing steered by said orientation map.

14. A computer program product according to claim 10 wherein translation difference image at a specific scale is computed out of an approximation image at the same scale.

15. A computer program product according to claim 10 wherein all of said translation difference images are computed out of the original image.

16. A computer program product according to claim 10 wherein the center difference images are identical to the multi-scale detail images.

17. A computer program product according to claim 10 wherein said image is a mammographic image.

18. A computer program product according to claim 10 wherein said image is a CT image.

19. A computer program product according to claim 10 wherein at least one of said enhanced center difference images is computed by anisotropic weighing of values of the enhanced translation difference image with weights steered by said orientation map.

20. A computer readable medium according to claim 1 wherein all of said translation difference images are computed out of the original image.

21. A computer readable medium according to claim 1 wherein at least one of said enhanced center difference images is computed by anisotropic weighing of values of the enhanced translation difference image with weights steered by said orientation map.

* * * * *